(12) United States Patent
Bione

(10) Patent No.: US 7,639,655 B2
(45) Date of Patent: Dec. 29, 2009

(54) ETHERNET SWITCH INTERFACE FOR USE IN OPTICAL NODES

(75) Inventor: Angelo A. Bione, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 982 days.

(21) Appl. No.: 10/324,631

(22) Filed: Dec. 20, 2002

(65) Prior Publication Data

US 2003/0140173 A1    Jul. 24, 2003

Related U.S. Application Data

(60) Provisional application No. 60/342,988, filed on Dec. 22, 2001.

(51) Int. Cl.
*H04W 4/00*    (2009.01)

(52) U.S. Cl. .................... 370/338; 370/359; 370/466

(58) Field of Classification Search ................. 370/338, 370/359, 465, 469, 498
See application file for complete search history.

(56) References Cited

U.S. PATENT DOCUMENTS

| | | | | |
|---|---|---|---|---|
| 5,719,872 A * | 2/1998 | Dubberly et al. | ............ | 370/487 |
| 5,953,345 A | 9/1999 | Findlater et al. | ............ | 370/446 |
| 5,974,058 A * | 10/1999 | Burns et al. | .................. | 370/538 |
| 6,334,219 B1 * | 12/2001 | Hill et al. | ..................... | 725/106 |
| 6,362,908 B1 * | 3/2002 | Kimbrough et al. | ......... | 398/164 |
| 6,385,208 B1 | 5/2002 | Findlater et al. | ............ | 370/419 |
| 6,516,352 B1 * | 2/2003 | Booth et al. | ................. | 709/250 |
| 6,580,785 B2 * | 6/2003 | Bremer et al. | ........... | 379/88.13 |
| 7,110,511 B2 * | 9/2006 | Goodman | ................ | 379/93.01 |
| 7,246,368 B1 * | 7/2007 | Millet et al. | ................. | 725/111 |
| 2003/0028688 A1 * | 2/2003 | Tiphane et al. | .................. | 710/1 |
| 2003/0137975 A1 * | 7/2003 | Song et al. | ................... | 370/353 |
| 2004/0028405 A1 * | 2/2004 | Unitt et al. | ..................... | 398/32 |

OTHER PUBLICATIONS

"Serial-MII Specification", Cisco Systems, Inc., ENG-46080, Revision 2.1, Feb. 9, 2000, pp. 1-7.

* cited by examiner

*Primary Examiner*—Jayanti K Patel
*Assistant Examiner*—Bo Hui A Zhu
(74) *Attorney, Agent, or Firm*—Tarolli, Sundheim, Covell & Tummino LLP

(57) ABSTRACT

Switch and MAC layer components are located at a headend and PHY layer components for connecting a plurality of end-user devices are located remotely at nodes. Using SSMII technology, MAC layer ports can communicate with an equal number of PHY layer interface ports serially. Thus, the MAC layer connects to the PHY layer via fiber links, a separate link being used for each direction of traffic data flow.

Information data is encoded along with a frame sync signal and a clock signal into a serial stream for transmission across the network. The serial stream is decoded at the other end, and the frame sync signal is extracted to provided timing functionality. This allows full duplex operation with the MAC layer separated from the PHY layer at distances greater than a few inches. Also, user device status may be monitored at the single switch location.

13 Claims, 3 Drawing Sheets

ETHERNET SWITCH INTERFACE FOR USE IN OPTICAL NODES

CROSS REFERENCE TO RELATED APPLICATION

This application claims the benefit of priority under 35 U.S.C. 119(e) to the filing date of Bione, U.S. provisional patent application No. 60/342,988 entitled "Ethernet Switch Interface For Use In Optical Nodes", which was filed Dec. 22, 2001, and is incorporated herein by reference.

FIELD OF THE INVENTION

This invention relates, generally, to communication networks and, more particularly, to increasing the distance between the physical layer and the switch components of an Ethernet switch.

BACKGROUND

As digital communications networks become more advanced, various chip makers and equipment maker's continue to improve and advance the devices, methods and systems used to facilitate higher and higher data transfer rates using smaller and less costly equipment and devices.

For example, Cisco Systems, Inc. has developed an improvement to the media independent interface ("MII") specification, which is known in the art for allowing a media access control ("MAC") layer to control and interact with the physical interface ("PHY") layer regardless of the type of physical media being controlled. The improvement is known in the art and defined by the Serial-MII ("SMII") specification.

SMII specifies that instead of using a conventional seven-wire arrangement for transferring Ethernet data between MAC and a corresponding PHY layer components, time division multiplexing ("TDM") techniques can be used to transport the same amount of data over two wires serially. This is accomplished by using a global clock signal to provide timing to a plurality of MACs and corresponding PHYs. In addition, a global sync signal is sent to the MACs and PHYs. Thus, each group (typically comprising eight MAC-PHY sets) of components need only have 4 pins/wires instead of the nine per MAC-PHY set used in a conventional Ethernet system.

While fewer pins and wires are required to connect the MACs to the PHYs under the SMII specification, the MACs and PHYs are inherently required to be located proximate one another, approximately within 1.5 ns. In other words, using SMII, MAC and corresponding PHY components should realistically be located on the same printed circuit board ("PCB"). This is due to trace delay caused by propagation characteristics of the connecting medium, such as copper.

To allow greater distances separation distances between the MAC and the PHY layers, a dedicated set of clock and sync signals may be used for the transmit direction and a separate set of dedicated signals may be used for the receive direction. This allows separation distances of the MAC layer devices from the PHY layer devices greater than the trace delay inherent in the SMII specification, while providing full duplex capability as well. This specification using separate signal sets for the transmit and receive directions respectively is known in the art as source synchronous serial media independent interface ("SSMII").

Application of an SSMII system may be useful in computer network systems, telephony systems or any other type of system that transmits and receives digital data using the Ethernet format. As shown in FIG. 1, a typical Ethernet system 2 may comprise a plurality of computers 4A-n, which are connected together through network 6, typically an optical fiber network. Each computer 4A-n typically interfaces through nodes (interface devices) 8A and 8B. It will be appreciated that network 2 may comprise many more computers 4 and interfaces 8 than shown in the figure. Each of the interface devices 8 typically comprises a PHY 10, a MAC 12 and a switch 14. PHY 10 is typically selected to provide an interface between the MAC, an electrical device, and the computer 4, which may connect electrically, optically or wirelessly, to the network 6. Switch 14 typically performs routing and signal flow functionality, i.e., which computer to route incoming signals to, and manage which connected computer (or other device) provides an outgoing signal at a given time. For example, if computer 4A is at a head end and computers 4B-n are subscribers, computer 4B may not be allowed to communicate directly with computer 4C, the communication therebetween being routed through network 6 back to the head end computer 4A. Thus, computer 4A can be used to provide security and monitoring, and other management functions. These management functions are often performed by a management computer 16 at headend 15 with computer 4A functioning as a data server. Whatever the management arrangement, each switch at each computer 4A-n is managed independently of the others. In addition to signal flow control it is often desirable to be able to determine whether a particular customer or subscriber has a computer (or other network device) connected to the network and to be able to determine whether that subscriber device is transmitting or receiving a signal. When an apparent malfunction has occurred and a customer needs assistance, it is often necessary for service provider personnel to physically drive to the node location that houses interface device 8B to perform basic diagnostic routines, such as visually checking to see whether one of computers 4B-n are plugged into the network and/or are transmitting/receiving when they are supposed to be. In addition, each switch, MAC and PHY device, typically comprising integrated circuits mounted on a PCB, has a cost associated with it.

Thus, there is a need for a method and system for implementing an Ethernet network using SSMII technology that reduces the complexity of managing the signal flow through the switches, that reduces the need for personnel having to physically go to a site to perform rudimentary diagnostic functions, and that maintains low cost of the system by using off-the-shelf parts.

SUMMARY

It is an object to provide a method and system for implementing a network using Ethernet technology wherein an Ethernet switch can be located at a central location and a plurality of PHY interface devices associated with the switch—each corresponding to an individual user—can be remotely located, the separation between the switch/MAC layer and the PHY devices being on the order of miles.

As discussed above, SMII Ethernet switch technology is used to reduce the number of connections between the MAC devices associated with the switch, and the PHY devices. The SSMII specification facilitates the extending of the separation distance between the switch/MAC and PHY layers up to approximately twelve inches, so that they may not be required to be mounted on the same PCB. To extend the distance between the switch/MAC and the PHY to distances on the order of miles, interface components are used. Thus, the MAC layer components and associated switch components can be located at a headend, for example, and the PHY layer components can be located remotely at a node that is near an end user.

An aspect of the invention provides an interface between the MAC layer and the PHY layer components so that each of these layers behaves as if it is located on the same PCB as the other, or at least within the same enclosure, such as a node housing, for example. Thus, instead of being limited to transfer between MAC and PHY components being proximately located, data can be transferred between MAC layer components and PHY layer components over a port-to-port network infrastructure spread out over a campus or even a metropolitan area. Accordingly, a full complement of components including a switch, MAC layer components and PHY layer components are not needed at both a headend, or other central location, and at the remote nodes.

Instead, the number of components used to implement a network architecture is reduced, as the node only has PHY layer components for interfacing with a user's device, such as a computer or other device for transmitting, receiving and processing information data. Moreover, the more expensive switch and MAC layer components are only located at the headend. Thus, material costs and complexity are reduced and the network is easier to manage.

To reduce costs even further, off-the-shelf components may be used to implement the architecture, as a channel normally used for transferring information data related to a particular user is used to transport clock and other timing signals. This reduces the need for additional links between the headend and node for transporting the timing signals, as the information signals are all transported together serially using SSMII technology. At each location of the network architecture pertinent to the invention described herein, these locations being referred to herein as the centrally located headend and the remotely located (with respect to the headend) nodes, transmit and receive circuitry and devices are used to provide interface between the MAC and PHY layers, and the network, preferably an optical fiber network. It will be appreciated that other network transport technologies may be used including copper gigabit backplane technology For the transmit direction, an encoder is used to encode eight channels of data, seven being information data and the other used for the timing signals referred to earlier. Thus, commonly available octal devices (such as an integrated circuit comprising eight MAC layer components or eight PHY layer components) can be used without the need for customized components. The encoded data is multiplexed using a serial transmitter into a typically 1.25 Gbps signal. This signal is then fed to a transmitting device, typically a laser, for transport across the network, which preferably comprises optical fiber.

For the receive direction, a detector device, preferably a photodiode used in the optical network scenario, receives a transmitted signal and feeds it to a serial receiver, typically operating at a frequency of 1.25 Gbps. The serial receiver demultiplexes the received serial signal, which is fed to a decoder that performs the opposite operation of the encoder in the transmit portion. The decoded data is then output as seven information channels of data and one timing channel of data.

BRIEF DESCRIPTION OF DRAWINGS

FIG. 3 illustrates an embodiment for increasing the distance between SSMII Ethernet layer components for use in node locations separate from one another.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof. Furthermore, while some aspects of the present invention are described in detail herein, no specific cable type, conductor type, fiber type, connector, enclosure, circuit board arrangement, laser type, for example, is required to be used in the practicing of the present invention. Indeed, selection of such parts and components would be within the routine functions of a designer skilled in the art.

Figure 1:
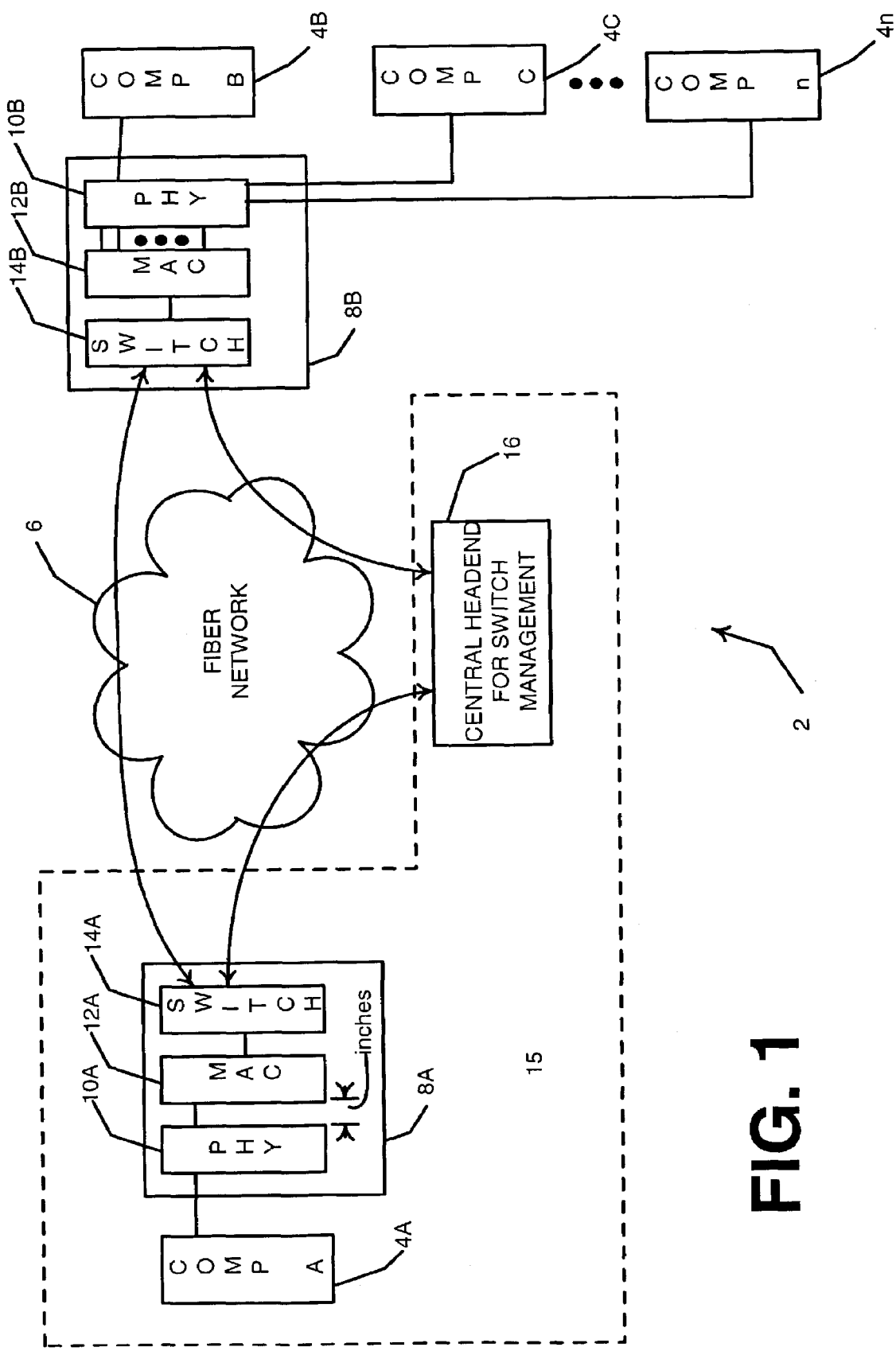
FIG. 1 illustrates a schematic of a network architecture using SSMII Ethernet technology at each node of the network.

Turning now to the figures, as discussed above, FIG. 1 illustrates an Ethernet system 2 that uses SSMII technology to transport data between a headend 15 and a plurality of remote nodes 8. Each node 8 comprises an Ethernet switch 14, a plurality of MAC layer components 12 and a plurality of PHY layer components 10 for providing an interface between fiber network 6 and user devices 4. As switches 14 facilitate routing of information and other data signals to various parts of the network 2, the central headend switch management components 16 manages each switching and routing function of the switches. Typically, the central office or headend 15 may comprise components 8A and 4A, as well as headend switch management components 16. Management components 16 are shown in FIG. 1 as separate from components 8A and 4A in order to illustrate that the headend typically comprises MAC layer and PHY layer components, as well as the management and switching components. However, these components may also be remotely located, or at least reside on separate PCBs. Thus, they are illustrated separately, but collectively surrounded by dashed lines to indicate that headend switch management components 16, interface device 8A, and computer 4A typically function as the headend 15. It is noted that the inches of separation shown between PHY 10A and MAC 12A is applicable for node 8B, as well as other nodes and Ethernet devices that are not shown for clarity, but would be referred to as 8C-8n if shown.

Figure 2:
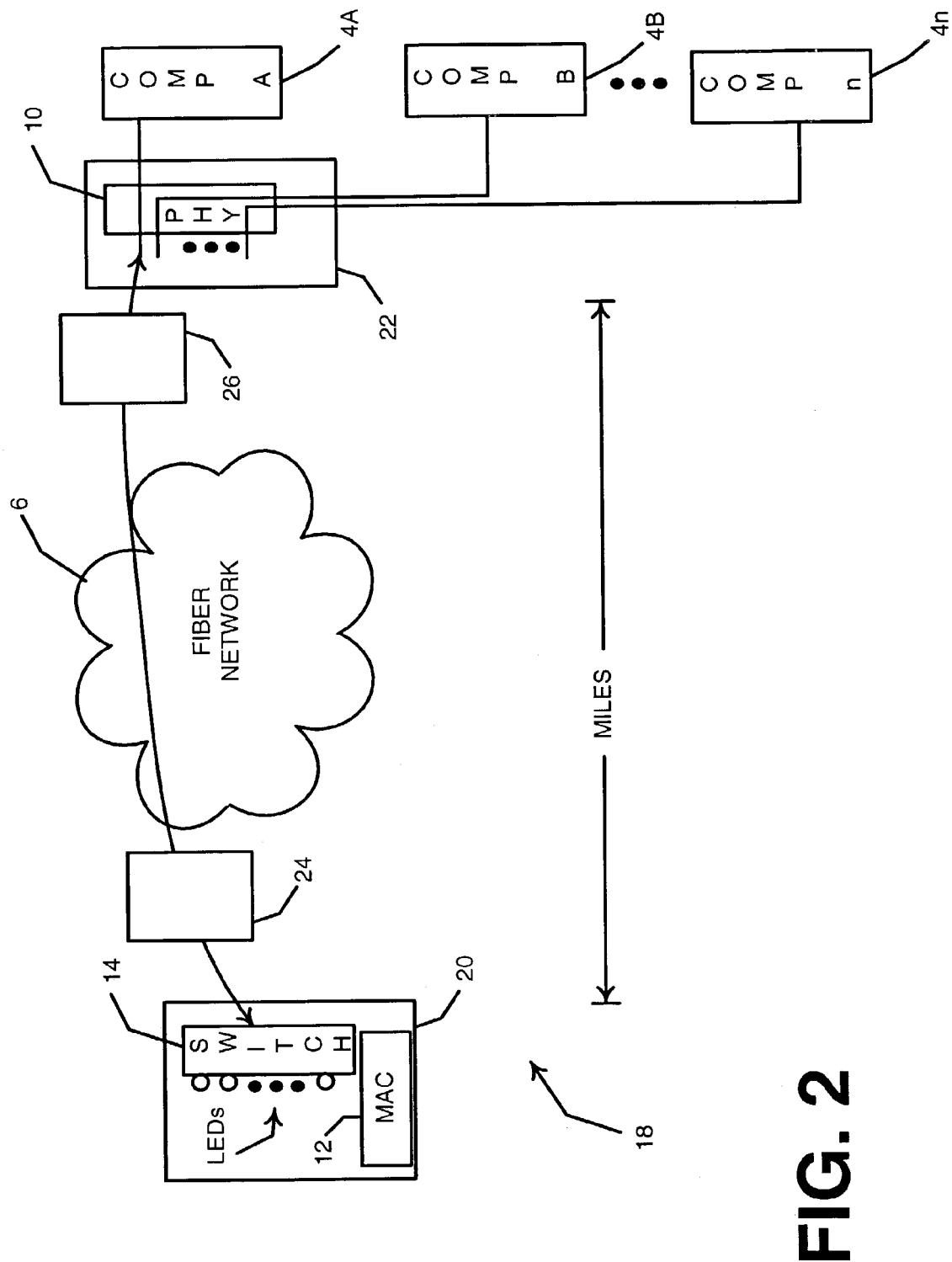
FIG. 2 illustrates a block diagram of a network architecture using SSMII Ethernet technology where one node has part of the SSMII components and the other node has the other components.
Figure 1:
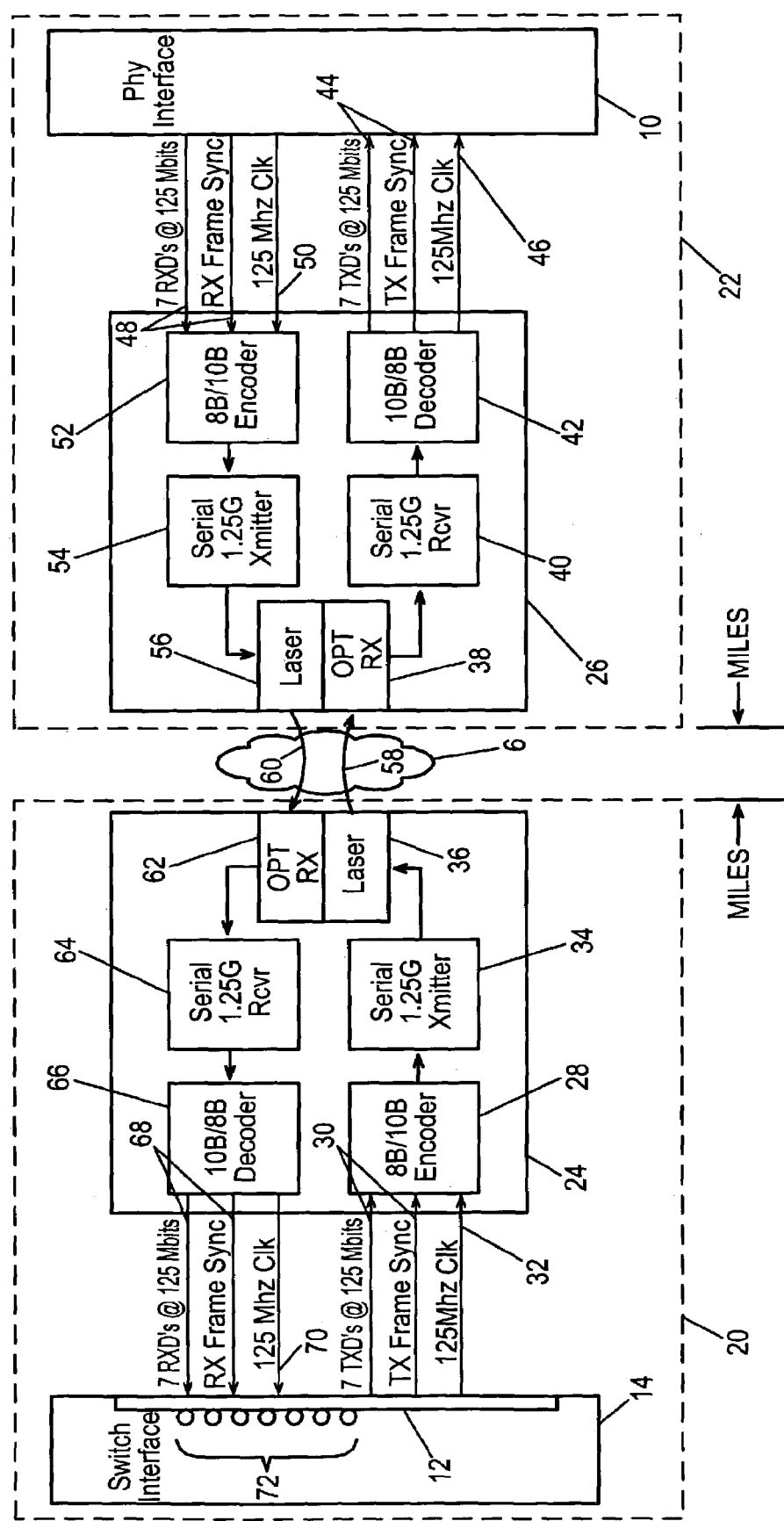

Turning now to FIG. 2, a network 18 is illustrated that implements transport of data over fiber network 6 using SSMII technology, wherein switch 14 and MAC 12 components are located at headend 20 and PHY layer components 10 are remotely located at node 22. It will be appreciated that multiple nodes may be served by headend 20. For purposes of example and discussion, PHY 10 referred to herein is an octal device having eight PHY layer ports on a single integrated circuit. However, it will be appreciated that node 22 may comprise multiple octal PHY (more or less than eight ports may be used as well) integrated circuits 10, and therefore may be capable of serving more than eight user devices 4.

As shown in the figure, a distance of miles rather than inches as shown in FIG. 1 separates the MAC components 12 and the PHY components 10. To facilitate the separation of miles instead of merely a few inches, network interface devices 24 and 26 provide an interface at headend 10 and node(s) 22 so that MAC 12 and PHY 10 can interact with one another via network 6, which may be spread out over many miles.

Turning now to FIG. 3, a schematic diagram is shown illustrating the components of interfaces 24 and 26 that facilitate the spreading out of the MAC components 12 from the PHY components 10 located at headend 20 and node 22 respectively. Interface 24 comprises an 8B/10B encoder 28 which receives input signals from MAC layers 12. Assuming that MAC 12 is an octal device having eight ports for data transport, eight transport links 30 feed information from the MAC to encoder 28. In addition a clock signal is provided from MAC 12 to encoder 28. Seven of the links 30 are used to feed information data signals from MAC 12 to encoder 28. The eighth link 30 is used for a transmit frame synchronization signal to be used upon decoding at node 22.

Encoder 28 takes the signals received from links 30 and 32, and encodes them into a 10-bit data stream that includes information data, frame sync data and a clock timing signal. The encoded signal is then fed to serial transmitter 34, which multiplexes the incoming data into a serial data stream at a rate of 1.25 Gbps. Laser 36 sends the multiplexed serial signal across network 6 toward node 22.

At node 22, receiver device 38, such as a photodiode, receives the optical signal sent by laser 36 over network 6, and converts the incoming data stream into an electrical signal. This electrical signal is then fed to serial receiver 40, which demultiplexes the data stream from the 1.25 Gbps signal, and sends the demultiplexed signal to 10B/8B decoder 42. Decoder 42 decodes the signal into seven different information data signals and a frame sync signal corresponding to the seven information data signals and the frame sync signal encoded by encoder 28 at headend 20. These seven information data signals and one frame sync signal are provided to seven corresponding information data ports and a frame sync input respectively at PHY 10 on links 44. The clock signal generated at headend 20 may be retrieved from decoder 42 and provided along link 46 to PHY 10, or a phase locked loop circuit ("PLL") may be used to generate a new clock signal based on the clock signal retrieved from the incoming serial data stream.

For the direction of data being transmitted from node 22 to headend 20, similar components as discussed above are used in interfaces 26 and 24. Assuming that PHY 10 comprises an octal device having eight interface ports for connecting with eight user devices, only seven ports are used to actually connect user devices. Thus, only seven of the set of eight lines 48 are used to transport information from PHY 10 toward headend 20. As with the transport of information in the other direction from headend 20 towards node(s) 22, one of the eight links 48 is used for a frame sync signal. In addition to links 48, a clock signal may be generated at node 22 and provided to interface device 26 via link 50. Alternatively, the headend clock signal clock signal received at node 22 may be reused for the clock timing signal in the reverse direction for transport from the node toward the headend 20. The information data and frame sync signal produced from output from PHY 10 on links 48, along with the clock signal on link 50, are encoded with encoder 52, preferably an 8B/10B encoder known in the art. The encoded signal is then fed into serial transmitter 54, which multiplexes the encoded signal into a 1.25 Gbps serial signal. The multiplexed serial data stream is then fed into transponder 56, preferably a laser, for transmission to headend 20 via network 6, preferably an optical fiber network. It will be appreciated that data flow in the two different directions is carried out on two separate serial data links, the serial data stream from headend 20 to node(s) 22 being transported on network link 58 and the data stream from node(s) 22 toward headend 20 over network link 60. Thus, full duplex transport of data is facilitated.

When the serial data stream from laser 56 reaches headend 20 via link 60, transponder 62, preferably an optical decoder device, such as, for example, a photodiode, converts the received signal into an electrical signal. Serial receiver 64 then demodulates the serial stream from the 1.25 Gbps signal, and feeds the demultiplexed signal to decoder 66, preferably a 10B/8B decoder known in the art. Decoder 66 separates the information data from the sync data and provides the information data to MAC layer 12 via seven of eight links 68. The frame sync signal is provided on the eighth link of links 68. The clock signal is provided on link 70, either directly from the decoded data stream, or generated by a PLL based on the incoming clock signal. Accordingly, full duplex communication between the headend 20 and nodes 22 is facilitated with a switch 14 and MAC layer 12 located at the headend, and the PHY layer at the node 22.

Furthermore, management is only required of one switch at the headend 20, as opposed to both at the headend and at the node(s) 22. This may reduce the number of occurrences when provider personnel must physically drive to the node location and perform diagnostics in the case of a malfunction. Indicators 72, preferably LEDs, may be used to provide monitoring of the status at the node 22. For example, if user devices are connected to only six of the seven ports served by PHY 10 (the eighth being unused as only seven links between interface device 26 and the PHY are used as discussed above), the six LEDs 72 corresponding to these users may be illuminated green with the other illuminated red. If trouble develops with one of the devices, or connection with PHY 10 related thereto, the corresponding LED 72 may be intermittently illuminated green, the flashing indicating to an observer at headend 20 that a problem may exist with a connected device.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A system for implementing a full duplex Ethernet data network the system comprising:

a MAC layer of the Ethernet data network that communicates with a corresponding PHY layer of the Ethernet data network;

a switch for receiving information signals from the MAC layer, the information signals received from the MAC layer to be provided to the corresponding PHY layer, the switch having a switch interface device in communication with a PHY interface device of the corresponding PHY layer via an optical network, the corresponding PHY layer coupled to user devices, the switch interface device and the PHY interface device each comprising:
an encoder for encoding an information signal;
a serial transmitter for generating a serial transmit signal based on the encoded information signal;
a laser for transmitting the serial transmit signal received from the serial transmitter as an optical information signal over the optical network;
an optical receiver for receiving the optical information signal from the optical network and converting said optical information signals into a corresponding electrical signal;
a serial receiver for conditioning the electrical signal received from the optical receiver and providing a serialized electrical signal; and
a decoder for converting the serialized electrical signal received from the serial receiver into an information signal,
wherein the switch and the MAC layer are remotely located from the corresponding PHY layer by a distance greater than twelve inches.

2. The system of claim 1, wherein each interface device includes octal devices, each octal device having eight transmit/receive conductor pairs corresponding to eight interface ports.

3. The system of claim 2, wherein seven of the eight transmit/receive conductor pairs are used for transport of information data and the eighth transmit/receive conductor pair is used for transporting a synchronization strobe signal.

4. The system of claim 1, wherein the switch and associated switch interface device and MAC layer are located at a headend, and the corresponding PHY layer and associated PHY interface device are located at a node that is remote from the head end and separated by the distance.

5. The system of claim 4, wherein the switch interface device transmits information signals to a plurality of PHY interface devices each associated with a PHY layer.

6. The system of claim 5, wherein a clock signal is generated at the headend, the clock signal being used to provide timing reference for the switch interface device, and wherein the clock signal is transported from the headend to the plurality of nodes to provide timing reference for the PHY interface device to synchronize the MAC layer and the corresponding PHY layer.

7. The system of claim 5, wherein miles separate the headend location and the node.

8. The system of claim 1, wherein the encoder and decoder are a 10B/8B encoder and decoder.

9. A method for interfacing a plurality of MAC layer devices with a plurality of corresponding PHY layer devices operating in full duplex mode across an Ethernet network, the method comprising the steps of:
receiving data from one of the plurality of MAC layer devices for a corresponding PHY layer device of the plurality of PHY layers at a switch, the switch having a switch interface device;
at the switch interface device, encoding the received data;
multiplexing the encoded information data into a serial data stream;
transmitting the serialized data stream with a transmitting means from one of a plurality of transmit conductors over the Ethernet network;
receiving the serialized data stream at an interface device associated with the corresponding PHY layer device of the plurality of PHY layer devices from the Ethernet network with a receiving means at a corresponding one of a plurality of receive conductors at a location remote from which the serialized data was transmitted;
demultiplexing the serialized data; and
decoding the demultiplexed data, the decoded data being the same data that was encoded,
wherein one of the plurality of transmit/receive conductor pairs is used for transporting a synchronization probe and the remaining plurality of transmit/receive conductor pairs are used for transporting information data, and
providing the decoded data to the corresponding PHY layer device of the plurality of PHY layer devices;
wherein the switch and the plurality of MAC layer devices are remotely located from the plurality of corresponding PHY layer devices by a distance greater than twelve inches.

10. The method of claim 9, wherein the data encoded includes information data and a frame sync signal.

11. The method of claim 9, further comprising the steps of:
receiving status information from the corresponding PHY layer device of the plurality of PHY layer devices indicating whether a user device is connected to the corresponding PHY layer device of the of the plurality of PHY layer devices;
at the interface device associated with the corresponding PHY layer device of the plurality of PHY layer devices, encoding the status information to be transmitted;
multiplexing the encoded status information into a serial data dream;
transmitting the serialized data stream with a transmitting means from one of a plurality of transmit conductors over the Ethernet network;
receiving the serialized data stream at the switch interface device by a receiving means at a corresponding one of a plurality of receive conductors at a location remote from which the serialized data was transmitted;
demultiplexing the serialized data; and
decoding the demultiplexed data, the decoded data being the same data that was encoded.

12. A system for implementing a full duplex Ethernet network, the system comprising:
a headend comprising:
a MAC layer device of the Ethernet network that communicates information signals with a corresponding PHY layer device of the Ethernet data network;
a switch located configured to receive and provide the information signals to and from the MAC layer device; and
a switch interface device coupled to provide an interface for sending via a network a serial data stream corresponding to the information signals from the MAC layer device to the corresponding PHY layer device and for receiving via the network a serial data stream corresponding to information signals from the corresponding PHY layer device, wherein the switch interface device comprises:
an encoder for encoding the information signals received from the MAC layer device into a serial data stream, the information signals to be provided to the corresponding PHY layer device;
a serial transmitter for transmitting the serial data stream;
a laser that sends the serial data stream as an optical signal to the at least one node via the network;
a transponder for receiving the optical signal from the network and converting the optical signal into electrical signals;

a serial receiver for conditioning the electrical signal received from the transponder and providing a serialized electrical signal; and a decoder for converting the serialized electrical signal received from the serial receiver into an information signal that is provided to the MAC layer device; and at least one node remotely located a distance from the head end that is greater than twelve inches, the at least one node comprising:

the corresponding PHY layer device coupled to send and receive information from a corresponding user device; and a PHY interface device configured to provide an interface for the corresponding PHY layer device to provide for communication via the network between the MAC layer device and the corresponding PHY layer device.

13. A system for implementing a full duplex Ethernet network, the system comprising:

a headend comprising:

a MAC layer device of the Ethernet network that communicates information signals with a corresponding PHY layer device of the Ethernet data network;

a switch located configured to receive and provide the information signals to and from the MAC layer device; and a switch interface device coupled to provide an interface for sending via a network a serial data stream corresponding to the information signals from the MAC layer device to the corresponding PHY layer device and for receiving via the network a serial data stream corresponding to information signals from the corresponding PHY layer device;

at least one node remotely located a distance from the head end that is greater than twelve inches, the at least one node comprising:

the corresponding PHY layer device coupled to send and receive information from a corresponding user device; and a PHY interface device configured to provide an interface for the corresponding PHY layer device to provide for communication via the network between the MAC layer device and the corresponding PHY layer device, wherein the PHY interface device comprises:

an encoder for encoding the information signals received from the corresponding PHY layer device into a serial data stream, the information signals being provided to the MAC layer device;

a serial transmitter for transmitting the serial data stream;

a laser that sends the serial data stream to the headend via the network;

a transponder for receiving optical signals from the network and converting the optical information signals into electrical signals;

a serial receiver for conditioning the electrical signal received from the optical receiver and providing a serialized electrical signal; and a decoder for converting the serialized electrical signal received from the serial receiver into an information signal that is provided to the corresponding PHY layer device.

* * * * *

UNITED STATES PATENT AND TRADEMARK OFFICE
CERTIFICATE OF CORRECTION

PATENT NO.       : 7,639,655 B2                                    Page 1 of 1
APPLICATION NO.  : 10/324631
DATED            : December 29, 2009
INVENTOR(S)      : Angelo A. Bione It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1441 days.

Signed and Sealed this

Twenty-first Day of December, 2010

David J. Kappos
*Director of the United States Patent and Trademark Office*